United States Patent [19]

Brokmeier

[11] Patent Number: 4,528,302
[45] Date of Patent: Jul. 9, 1985

[54] MOULDINGS AND THE PRODUCTION THEREOF COMPRISING CEMENT REINFORCED WITH PAN FIBERS CONTAINING ZR.

[75] Inventor: Dieter Brokmeier, Dormagen, Fed. Rep. of Germany

[73] Assignee: Bayer Aktiengesellschaft, Leverkusen, Fed. Rep. of Germany

[21] Appl. No.: 560,342

[22] Filed: Dec. 12, 1983

[30] Foreign Application Priority Data

Dec. 22, 1982 [DE] Fed. Rep. of Germany ....... 3247351

[51] Int. Cl.³ .......................... C08K 9/02; C08K 7/02; B29D 3/02
[52] U.S. Cl. .................................. 523/204; 523/205; 524/5
[58] Field of Search ...................... 524/5; 523/205, 204

[56] References Cited

U.S. PATENT DOCUMENTS 3,979,544  9/1976  Kolbe et al. ........................ 428/375

FOREIGN PATENT DOCUMENTS 2431847   8/1975   Fed. Rep. of Germany.
3012998  10/1981   Fed. Rep. of Germany.
781188   11/1980   U.S.S.R.

OTHER PUBLICATIONS

Derwent Abst. 28088 E/14 (SU 834132) 5-1981.
Derwent Abst. 17801 C/10 (SU 668944) 6-1979.
Derwent Abst. 57283 W/35 (DE 2431847) 8-1975.
Dewent Abst. 77892 D/43 (DE 3012998 Equiv. Ref. M above).

Primary Examiner—Herbert J. Lilling
Attorney, Agent, or Firm—Sprung, Horn, Kramer & Woods

[57] ABSTRACT

Mouldings having a matrix reinforced by polyacrylonitrile fibers, or organic or inorganic material show improved properties, especially strength if the fibers have previously been treated with a mineral tanning substance.

4 Claims, No Drawings

MOULDINGS AND THE PRODUCTION THEREOF COMPRISING CEMENT REINFORCED WITH PAN FIBERS CONTAINING ZR.

This invention relates to mouldings having a matrix of an organic or inorganic material reinforced by polyacrylonitrile fibres, and to a process for the production thereof.

It is already known from German Offenlegungsschrift No. 3,012,998 that polyacrylonitrile fibres which are provided on their surface with a crystalline layer which is formed from the insoluble reaction product of a basic mineral with an alkylsulphamido carboxylic acid, may be used to reinforce mouldings having a matrix of organic or inorganic material. Although mouldings of a high strength are acheived, for example using portland cement, a disadvantage of this process is that the moulding production is expensive and must be carried out directly after the primary fibre treatment if the desired success is to be achieved.

However, unequipped polyacrylonitrile fibres are practically ineffectual, because adequate adhesion to the organic or inorganic material does not occur.

It has now been found that it is more easily possible to produce mouldings of the above-mentioned type which have good properties if polyacrylonitrile fibres are used which have previously been treated with mineral tanning substances.

Synthetic fibres, in particular polyamide and polyester fibres which have been treated with mineral tanning substances are already known from German Patent No. 2,431,847.

However, this patent describes their use exclusively for electrostatic flocking, the finishing operation with mineral tanning substances serving the purpose of imparting to the fibres the necessary electrical conductivity and sprinkling ability.

A suggestion of using polyacrylonitrile fibres which have been treated with mineral tanning substances for the production of fibre-reinforced mouldings, in particular of inorganic material cannot be inferred from this reference.

Suitable polyacrylonitrile fibres are those of acrylonitrile homo- and copolymers, but in particular those which have an acrylonitrile content of more than 98% by weight. Acrylonitrile homopolymers are preferred. The fibres preferably have the following properties:- a denier of from 0.5 to 10 dtex; a tenacity of from 20 to 80 cN/tex; and a modulus of from 500 to 1,000 dN/mm$^2$ at an elongation of 2%.

In particular, the fibres have the following properties: a denier of from 0.6 to 6.7 dtex; a tenacity of from 50 to 70 cN/tex; and a modulus of from 700 to 1200 dN/mm$^2$ at a 2% elongation.

Suitable mineral tanning substances are water-soluble, preferably basic or hydrolyzable salts of chromium, iron, aluminium and zirconium, as they are described in Winnacker-Küchler, Chemische Technologie, Volume IV, 1960, P. 657 et seq.,. Salts of zirconium, such as zirconyl sulphate are preferred.

The fibres are appropriately treated with a liquor, in which the mineral tanning substances are dissolved in a quantity of from 1 to 5 g/l, the liquor ratio (parts by weight of fibres based on parts by weight of aqueous mineral tanning substance solution) ranging from 1:10 to 1:40. Of course, it is to be considered that finer fibres have a greater surface area, based on the weight, than coarser fibres, and therefore they should absorb more mineral tanning substance, based on the weight.

The liquor has a low pH value due to the mineral tanning substance. In the case of zirconyl sulphate, it is about 1.5.

Fibres which have a particularly good adhesion are obtained by increasing the pH during the treatment with the mineral tanning substance, preferably by 1 to 2 units, i.e., in the case of zirconyl sulphate to about 2.5. The treatment of the fibres takes place at a slightly elevated temperature, preferably from 40° to 60° C. The fibre treatment takes from about 5 to 60 minutes, preferably from 10 to 40 minutes. Thereafter, the fibres are removed from the liquor, brought to a residual moisture content of from 20 to 40% by weight, based on dry fibres, for example by centrifugation, and then used in this form, even after a comparatively long storage, for the production of the mouldings according to the present invention. Under microscopic examination it is possible to see that a crystalline deposit has formed on the surface of the fibres.

Suitable organic or inorganic materials include, for example polyamides, polyesters, polycarbonates, gypsum and cement, outstanding results being achieved particularly during the reinforcement of cement.

The mouldings are appropriately produced by introducing the fibres into a melt, a solution of suspension of the organic or inorganic material, and then hardening.

EXAMPLE 50 g of fibres of a polyacrylonitrile homopolymer having a denier of 1.5 dtex; a tenacity of 50 cN/dtex; an elongation at break of 10.2%; and an initial modulus of 961 dN/mm$^2$ at a 2% elongation are agitated for 10 minutes at 50° C. in an aqueous liquor of 5 g/l of ZrO-SO$_4$.4H$_2$O in a liquor ratio of 1:20. A pH value of 1.5 is adjusted, and the solution becomes cloudy.

The pH value is increased to 2.5 by adding Na$_2$HPO$_4$, and the clouding of the liquor increases. The fibres are agitated for a further 10 minutes in the liquor, then removed from the liquor and centrifuged to a residual moisture content of 30%.

The fibres are stirred with an aqueous cement liquor (2% by weight of fibres based on the solids of the cement liquor). The cement liquor is poured into a mould and left to harden for four weeks. Mouldings which have outstanding properties are obtained.

I claim:

1. Mouldings made from cement reinforced by polyacrylonitrile fibers which contain a zirconium salt.

2. Mouldings of claim 1, wherein the polyacrylonitrile fibres have a denier of from 0.5 to 10 dtex, a tenacity of from 20 to 80 cN/tex and a modulus of from 500 to 1000 dN/mm$^2$ at an elongation of 2%.

3. Mouldings of claim 1, wherein the polyacrylonitrile fibres have a denier of from 0.6 to 6.7 dtex, a tenacity of from 50 to 70 cN/tex and a modulus of from 700 to 1200 dN/mm$^2$ at an elongation of 2%.

4. A process for the production of mouldings according to claim 1 comprising introducing polyacrylonitrile fibers, which have previously been treated with a zirconium salt, into a suspension containing cement and hardening the resultant mixture.

* * * * *